United States Patent Office 3,613,209
Patented Oct. 19, 1971

3,613,209
PROCESS FOR MANUFACTURING GOLD ALLOY WATCH CASINGS
Ervin Piquerez, Bassecourt, Switzerland
No Drawing. Continuation-in-part of application Ser. No. 685,956, Nov. 27, 1967, which is a continuation-in-part of application Ser. No. 437,592, Mar. 5, 1965, now abandoned. This application Dec. 9, 1969, Ser. No. 883,588
Int. Cl. B23p *13/00*
U.S. Cl. 29—179     10 Claims

ABSTRACT OF THE DISCLOSURE

A process for manufacturing watch casings composed of gold or gold alloy is disclosed. A suitable gold alloy is melted with an oxidization inhibiting metal in an inert gas and the molten metal is then injection molded into the shape of a watch casing. The watch casing is then heat treated for two to five hours at a temperature near 400° C. to eliminate internal strains formed during the molding operation. Finally the watch casing is surface hardened and polished whereupon it is ready for commercial use.

---

This application is a continuation-in-part of application Ser. No. 685,956, filed Nov. 27, 1967 which is a continuation-in-part of application Ser. No. 437,592, filed Mar. 5, 1965 and now abandoned.

The principal object of the present invention is to provide a process for manufacturing watch casings formed from gold or gold alloys by a single molding or die casting operation.

Another object of the present invention is to provide a method of manufacturing watch casings having a fine grained surface and being substantially free of occlusions and structural irregularities.

It is a further object of the present invention to provide a novel heat treating operation for the molded watch casings whereby internal strains created during the molding operation are relieved.

Various methods for manufacturing watch casings by molding non gold alloys, such as zinc or aluminum-containing alloys, are known. Such manufacturing methods produce watch casings having a rough, coarse crystalline structure, poor mechanical resistance, and lack sufficient hardness. In addition, the rapid cooling employed in the prior art techniques results in a very porous product making it virtually impossible to produce high quality watch casings.

Difficulty has been encountered in attempting to injection mold gold and gold-based alloys due to the high temperatures and pressures required. Gold and gold-based alloys develop intense fields of anisotropic strain when subjected to injection molding techniques and are very susceptible to cracking and other internal disruptions. Moreover, when such alloys are injection molded, they tend to retain gases therein and occlusions and oxide formations make the alloys too porous for use in high quality watch casings. Injection molding also lowers the corrosion resistance of gold and gold-based alloys thereby further making such techniques unsuitable for producing high quality watch casings.

The process of the present invention obviates the aforementioned disadvantages and briefly comprises selecting a suitable gold alloy and heating same to a molten condition in an inert atmosphere under a vacuum of between $10^{-3}$ to $10^{-4}$ atmospheres; immediately transferring the molten gold alloy, preferably while heating same, to an injection molding apparatus; subjecting the alloy to a pressure of between 10,000 to 20,000 kg. cm.$^2$; and finally heat treating the molded watch casings for approximately two to five hours at a temperature not greater than 400° C. The watch casings are then suitably surface hardened, such as by cold forging, sanding or shot peening, and then polished.

The process of the present invention can be carried out using gold alone, which has a melting temperature of 1050° C., or with gold-copper alloy, gold-silver alloy or a gold-zinc alloy which all have lower melting temperatures. A suitable "coloring" metal may also be added, as well known in the art, to impart a desired color to the final product. It is known that when gold alloys are injection molded, they develop occlusions due to oxide formations. The solubility of oxygen in the molten alloy varies depending upon the alloy composition and is about 350, 100, and 35 parts per million (p.p.m.) for 9, 14 and 18 carat gold alloys, respectively. Therefore it is preferable to add a suitable deoxidizing metal, such as zinc or aluminum, to the gold alloys to effectively deoxide the oxygen-saturated alloys while in the liquid state.

It has been found that by adding 40 p.p.m. of aluminum or 140 p.p.m. of zinc for an 18 carat alloy, such is effective to prevent the formation of occlusions due to the approximately 35 p.p.m. of oxygen. In a similar manner, 110 p.p.m. of aluminum or 440 p.p.m. of zinc will adequately inhibit the formation of occlusions in a 14 carat alloy and 400 p.p.m. of aluminum and 1400 p.p.m. of zinc will do the same for a 9 carat alloy. However, aluminum is much less soluble in gold alloys than is zinc and therefore zinc is preferably used as the oxidation inhibitor. It is important to note that during an injection molding operation, air is trapped in the mold and mixed with the molten metal. The actual injection speed of the molten alloy into the mold or die is approximately 5 hundredths of a second and the amount of air trapped varies from one injection operation to another and cannot be controlled with any degree of accuracy.

Since the solubiilty of aluminum in gold alloys is very slight, excess aluminum precipitates during solidification of the gold alloy and due to its affinity for oxygen, it spontaneously forms an oxide which embrittles the oxidizer and is incorporated into the gold alloy during the melting process. It has been found that the addition of two parts per thousand of zinc to an NIHS standardized 18 or 14 carat alloy is sufficient. It has also been found that zinc may be added in amounts up to ten parts per thousand in alloys ranging from 9 to 14 carats and in this latter situation, the zinc also functions to change the hue of the alloy from red to yellow and such is desirable since the yellow color is preferred.

The mixture of the gold alloy and the oxidation inhibitor are rapidly melted in a crucible in an inert atmosphere and preferably under vacuum. One type of heating apparatus for practicing the present invention is a high-frequency induction furnace. The gold alloy is placed in crucibles, which are preferably formed of ceramic or vitreous graphite to preclude contamination, and heated under a vacuum of from $10^{-3}$ to $10^{-4}$ atmospheres. An Oxygen free or inert atmosphere is maintained to avoid oxidation and such can be accomplished by heating the crucibles in an inert gas such as nitrogen, argon, neon or krypton. It has also been found that the alloy should be heated to a temperature somewhere between 5 and 30% above its melting point.

After the mixture of gold alloy and oxidation inhibitor metal is melted, it is immediately transferred to an injection molding or die casting apparatus. Due to the tendency for the gold alloy to oxidize, even despite the inclusion of the oxidizing inhibitor metal, it has been found desirable to heat the molten alloy during its transfer to the molding apparatus. The mold or die is preshaped in the form of a watch casing and is formed of a material having a very high melting point, such as molybdenum, tungsten, or their alloys. The die or mold is reusable and is suitably lubricated before each use, preferably with a suspension of molybdenum disulfide in a grease of medium consistency. As aforementioned, it is desirable to protect the gold alloy from oxidizing during both the melting and transferring of the molten alloy to the injection mold. One practical method for accomplishing this is to surround the alloy with a screen of protective gas, for example, by a layer of burning gas which completely surrounds the alloy during its melting and transferal to the mold. Depending upon the alloy composition, the molding or dieing pressure would be maintained between 10,000–20,000 kg./cm.$^2$. The molten alloy is transferred from the crucible to the entrance of the die casting or moulding apparatus under controlled temperature conditions, as for example by regulating the temperature of the screen of burning gas.

The molded or die-cast watch casing is then subjected to a thermal treatment to eliminate internal strains formed during the molding operation and to effect reabsorption of the segregated metal formed during the crystallization of the alloy. As the watch casing is cooled and solidified in the mold, intense fields of anisotropic strain are formed and the metal alloy segregates as it crystallizes. The thermal treatment is performed at a temperature substantially near 400° C. but never above 400° C. A thermal treatment at approximately 400° C. substantially eliminates the fields of anisotropic strain within 15 to 30 minutes but such a time period is much too short to effect total reabsorption of the segregated metal. It has been found that gold alloys, which are suitable for injection molding due to their fluidity, also possess broad areas of metal segregation and hence require a relatively long period of thermal treatment. The period of time for effecting reabsorption of the segregated metal increases with the coarseness of crystallization and also increases as the areas of concentration in which segregation has occurred are extended. Watch casings have a small thickness and a relatively large surface area and by experimentation it has been found that a thermal treatment at close to 400° C. for from two to five hours is sufficient to eliminate most of the segregated metal and to restore the normal color of the alloy.

It should be emphasized that the above-mentioned thermal treatment is unique and completely differs from that used for commercial gold alloys. Normally, commercially sold gold alloys are thermally treated at temperatures between 0.6 and 0.8 times that of the solidus (which is the portion of a temperature composition diagram which consists of the curve connecting the temperatures at which a solid solution is in equilibrium with its vapor and with the liquid solution and therefore connects melting temperature of solid solutions) for from 10 to 30 minutes. Such alloys are sold in a single-phase recrystallized state and have a very coarse crystal structure and hence are not suitable for use as watch casings.

After the molded watch casings have undergone thermal treatment, they possess a very fine grained surface. The watch casings are then surfaced hardened, preferably by a mechanical treatment such as cold forging, sanding or shot peening. After the surface hardening operation, the watch casings need then only be polished before they are ready for commercial use.

Watch casings manufactured in accordance with the present invention were examined both microscopically and macroscopically. They exhibited a smooth surface free of any cracks and a homogeneous, fine grained internal structure. Moreover, the casings were substantially free of occlusions and surface irregularities.

What I claim and desire to secure by Letters Patent is:

1. A process for manufacturing gold alloy watch casings comprising: providing a mixture of gold alloy and an oxidation inhibiting metal effective to prevent oxide formation in said gold alloy; melting said mixture into a molten metal in the absence of oxygen; forming said molten metal into the shape of a watch casing under a pressure sufficient to develop internal strains and segregation of the metal; and heat treating said watch casing at a temperature approximately equal to but not greater than 400° C. for two to five hours to substantially eliminate said internal strains and to effect reabsorption of said segregated metal.

2. A process according to claim 1, wherein said step of forming said molten metal into the shape of a watch casing comprises molding said molten metal under a pressure of between 10,000 to 20,000 kg./cm.$^2$.

3. A process according to claim 1, wherein said oxidation inhibiting metal comprises zinc.

4. A process according to claim 1, wherein said step of melting said mixture into a molten metal in the absence of oxygen comprises melting said mixture under a vacuum of from $10^{-3}$ to $10^{-4}$ atmospheres.

5. A process according to claim 1, further including surface hardening the heat treated watch casing; and then polishing the surface hardened watch casing.

6. A process according to claim 1, wherein said step of forming said molten metal into the shape of a watch casing comprises transferring said molten metal to a mold having means therein defining a watch casing-shaped cavity; and subjecting the molten metal in said cavity to a pressure of between 10,000 to 20,000 kg./cm.$^2$.

7. A process according to claim 6, further including heating said molten metal during its transferral to said mold.

8. A process according to claim 7, wherein said step of heating said molten metal during its transferal to said mold comprises surrounding said molten metal with a layer of burning gas.

9. A process according to claim 7, wherein said oxidation inhibiting metal comprises zinc.

10. A process according to claim 7, wherein said step of melting said mixture into a molten metal in the absence of oxygen comprises melting said mixture under a vacuum of from $10^{-3}$ to $10^{-4}$ atmosphere.

References Cited

UNITED STATES PATENTS

| | | | |
|---|---|---|---|
| 284,926 | 9/1883 | Weeden | 29—179 X |
| 1,000,470 | 8/1911 | Widmann | 249—135 X |
| 1,589,967 | 6/1926 | Horowitz | 164—258 |
| 2,169,592 | 8/1939 | Peterson | 75—165 |
| 3,117,864 | 1/1964 | Heath et al. | 75—135 |
| 3,280,434 | 10/1966 | Cecere | 164—258 |

FOREIGN PATENTS

| | | | |
|---|---|---|---|
| 205,700 | 10/1923 | Great Britain | 164—120 |

JOHN F. CAMPBELL, Primary Examiner

V. A. DI PALMA, Assistant Examiner

U.S. Cl. X.R.

29—527.5; 75—165; 148—3; 164—120